(12) United States Patent
Santiago Baerga

(10) Patent No.: US 11,732,879 B2
(45) Date of Patent: Aug. 22, 2023

(54) COMPOSITE LUMINAIRE

(71) Applicant: EATON INTELLIGENT POWER LIMITED, Dublin (IE)

(72) Inventor: Jeremy M. Santiago Baerga, Southfield, MI (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 0 days.

(21) Appl. No.: 17/726,054

(22) Filed: Apr. 21, 2022

(65) Prior Publication Data
US 2022/0341582 A1    Oct. 27, 2022

Related U.S. Application Data

(60) Provisional application No. 63/178,930, filed on Apr. 23, 2021.

(51) Int. Cl.
*F21V 29/77* (2015.01)
*F21V 29/87* (2015.01)
*F21K 9/90* (2016.01)
*F21Y 115/10* (2016.01)

(52) U.S. Cl.
CPC ............. *F21V 29/87* (2015.01); *F21K 9/90* (2013.01); *F21V 29/777* (2015.01); *F21Y 2115/10* (2016.08)

(58) Field of Classification Search
CPC .......... F21V 29/87; F21V 29/777; F21K 9/90; F21Y 2115/10
See application file for complete search history.

(56) References Cited

U.S. PATENT DOCUMENTS

| 8,197,098 B2 | 6/2012 | Cook | |
| 2011/0050070 A1* | 3/2011 | Pickard | F21V 29/51 313/46 |
| 2014/0240989 A1 | 8/2014 | Hardikar et al. | |
| 2014/0240994 A1* | 8/2014 | Lim | F21K 9/238 362/382 |
| 2014/0307427 A1* | 10/2014 | Joo | F21K 9/23 362/186 |
| 2015/0316248 A1* | 11/2015 | Feit | F21V 19/0065 362/373 |

(Continued)

FOREIGN PATENT DOCUMENTS

| CN | 101210670 A | 7/2008 |
| CN | 201265843 | 7/2009 |
| CN | 102721020 A | 10/2012 |

(Continued)

OTHER PUBLICATIONS

English translation of Lotfi FR 3 035 200, published Oct. 2016 (Year: 2016).*

(Continued)

*Primary Examiner* — Evan P Dzierzynski
(74) *Attorney, Agent, or Firm* — Squire Patton Boggs (US) LLP

(57) ABSTRACT

A luminaire includes a core made up of a first material and an LED lighting arrangement mounted to the core. The luminaire further includes a housing made up of a second material. The second material is different from the first material. The housing including a recess in which the core is received. The housing further includes a finned part.

16 Claims, 7 Drawing Sheets

(56) References Cited

U.S. PATENT DOCUMENTS

2021/0231301 A1* 7/2021 Hikmet .................. F21V 29/74

FOREIGN PATENT DOCUMENTS

| EP | 2772685 | 9/2014 |
| FR | 3035200 | 10/2016 |
| KR | 20170047996 | 5/2017 |
| WO | 2013156511 | 10/2013 |

OTHER PUBLICATIONS

European Search Report; Corresponding EP Application No. 22169574; dated Sep. 20, 2022.

* cited by examiner

COMPOSITE LUMINAIRE

CROSS-REFERENCE TO RELATED APPLICATION

The present application claims the benefit of the filing date of U.S. Provisional Patent Application No. 63/178,930 filed on Apr. 23, 2021, the disclosure of which is incorporated herein in its entirety.

GOVERNMENT INTEREST

This invention was made with government support under DE-EE0008722 awarded by the United States Department of Energy. The government has certain rights in the invention.

FIELD OF INVENTION

The present disclosure relates to lighting. More particularly, the present disclosure relates to a composite luminaire.

BACKGROUND

Environmental concerns and economic factors have driven the development of technologies that reduce energy consumption. One area where substantial energy savings may be realized is the field of luminaires (e.g., lighting units). Traditionally, luminaires have utilized incandescent bulbs to provide illumination. While incandescent bulbs provide sufficient illumination, they may be undesirable in regard to comparatively high power consumption and comparatively short service life. Light emitting diode (LED) bulbs are known to consume approximately 75% less energy than an incandescent bulb of equivalent lumens, thereby offering substantial energy savings. Additionally, LED bulbs may last up to 20 times as long as an equivalent incandescent bulb.

LED bulb service life may be maximized by keeping the LED bulb below 85° C. during operation. While it is known to provide LED bulbs with heat sinks to meet this operation goal, current heat sinks are visually unappealing or have limited effectiveness and design flexibility. These limitations can be attributed to, in part, known heat sink manufacturing processes, such as casting and extruding of a single material.

SUMMARY OF THE INVENTION

In one embodiment, a luminaire includes a core made up of a first material and an LED lighting arrangement mounted to the core. The luminaire further includes a housing made up of a second material. The second material is different from the first material. The housing including a recess in which the core is received. The housing further includes a finned part.

In another embodiment, a method of manufacturing a luminaire includes forming a core from a first material and forming a housing from a second material different from the first material. The housing including a recess. The method further includes creating a temperature differential between the first material and the second material. The core is introduced into the recess to secure the core to the housing. An LED lighting arrangement is secured on the core.

In yet another embodiment, a luminaire includes a core made up of a first material. An LED lighting arrangement is mounted to the core. The luminaire further includes a housing made up of a second material that is different from the first material. The housing includes a recess for receiving the core and a finned part. The finned part extends radially from the central part. A reflector is secured to the housing. The reflector is configured to direct and focus light emitted by the LED arrangement.

BRIEF DESCRIPTION OF DRAWINGS

In the accompanying drawings, structures are illustrated that, together with the detailed description provided below, describe exemplary embodiments of the claimed invention. Like elements are identified with the same reference numerals. It should be understood that elements shown as a single component may be replaced with multiple components, and elements shown as multiple components may be replaced with a single component. The drawings are not to scale and the proportion of certain elements may be exaggerated for the purpose of illustration.

DETAILED DESCRIPTION

Figure 1:
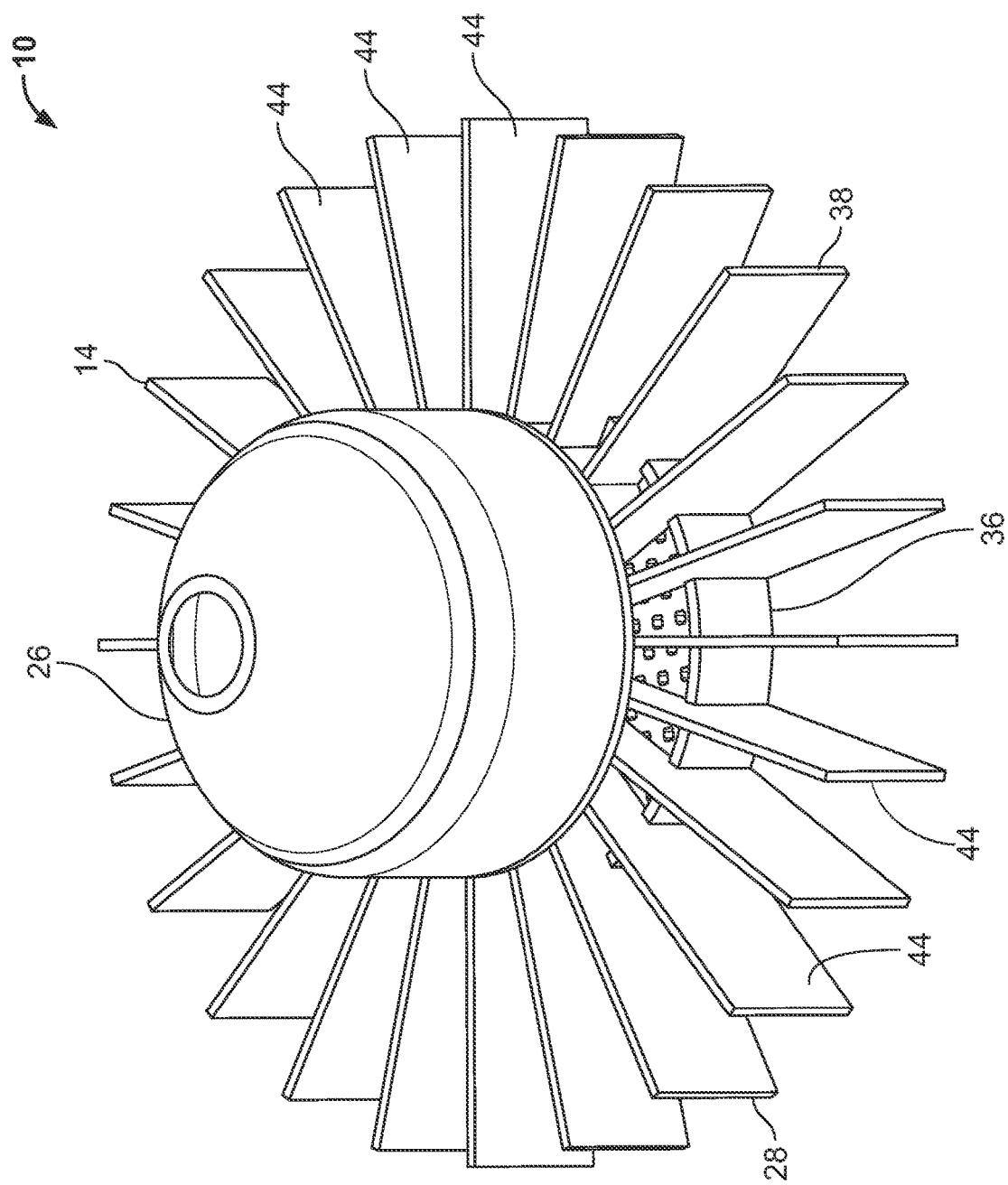
FIG. 1 is a perspective view of one embodiment of an LED luminaire.
Figure 2:
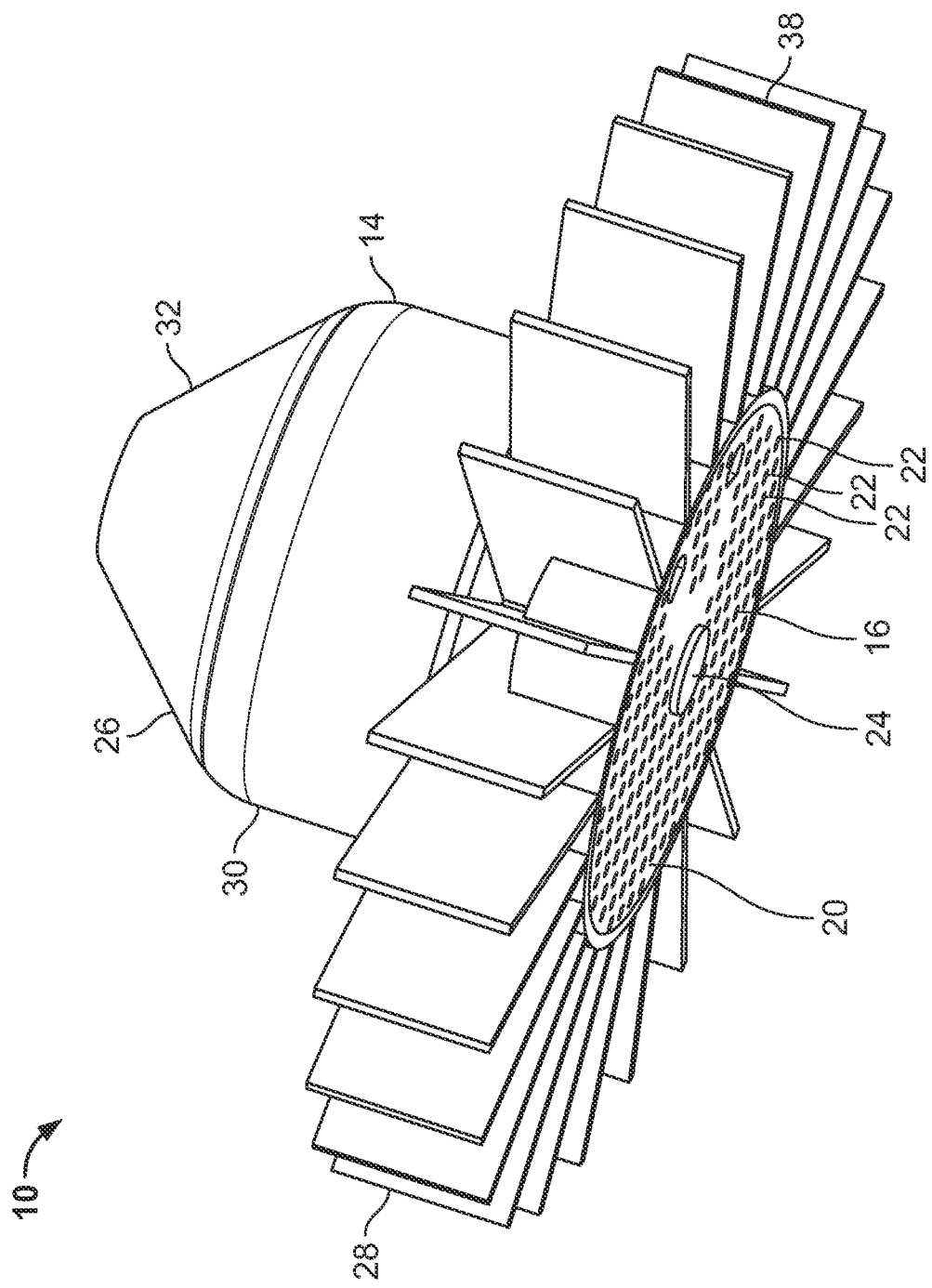
FIG. 2 is another perspective view of the LED luminaire of FIG. 1.
Figure 3:
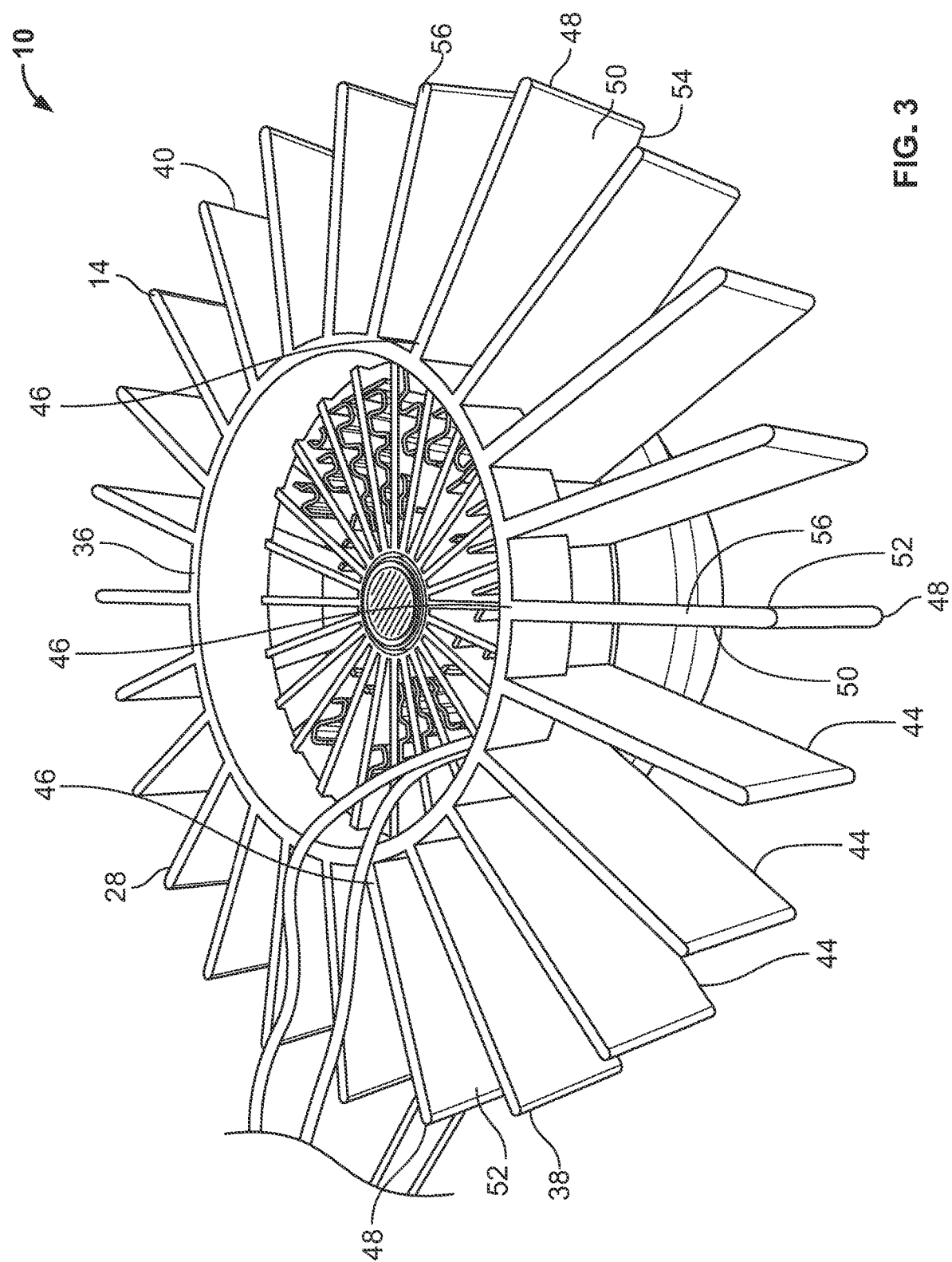
FIG. 3 is a perspective view of a housing of the LED luminaire of FIG. 1 with a core removed.
Figure 4:
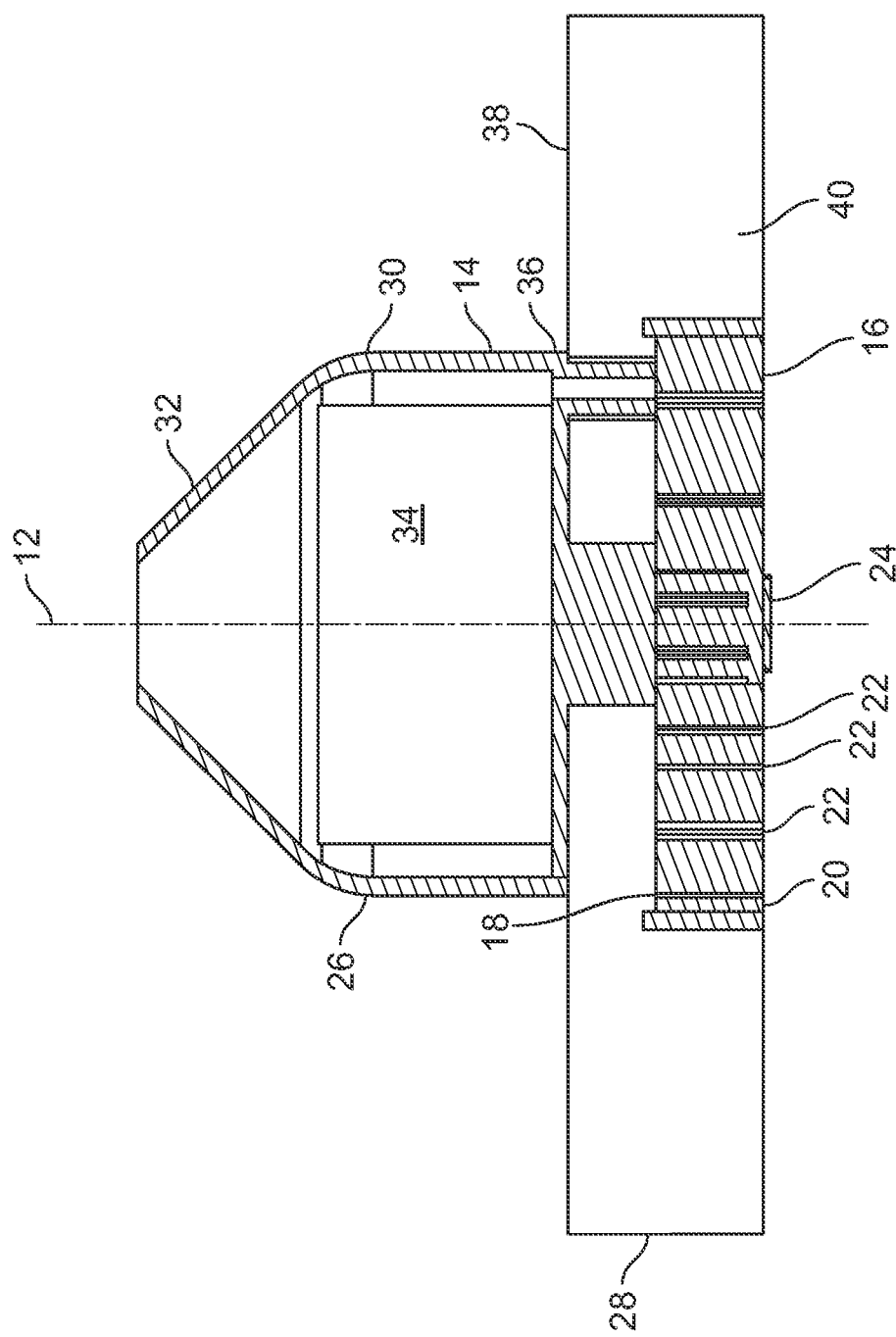
FIG. 4 is a sectional view of the LED luminaire of FIG. 1.

FIGS. 1-4 show one embodiment of an LED luminaire 10. The luminaire 10 extends along a central axis 12, and includes a housing 14 and a core 16. The core 16 extends between a first end 18 and a second end 20. In the illustrated embodiment, the core 16 is substantially cylindrical. In alternative embodiments, the core may be provided as any desired shape. In one embodiment, the core 16 is made up of AlSi10Mg and is manufactured by an additive manufacturing (or 3D printing) process. In alternative embodiments, the core may be made up of material having a thermal conductivity greater than 34 W/m-K including, for example, aluminum alloys and copper. In alternative embodiments the core may be manufactured using casting or extruding processes.

In the illustrated embodiment, a plurality of passageways 22 extend completely through the core 16 from the first end 18 to the second end 20. Each one of the plurality of passageways 22 extends substantially parallel with the central axis 12 and has a substantially circular cross section. In alternative embodiments, the passageways may extend only part way through the core or may be omitted altogether. In other alternative embodiments, the passageways may have any desired orientation relative to the central axis or may have any desired cross section shape. In still yet other alternative embodiments, the LED lighting arrangement may be located at any position on the core, or there may be more than a single LED lighting arrangement.

An LED lighting arrangement 24 is mounted to the second end 20 of the core 16. The LED lighting arrangement 24 is located centrally on the core 16 so as to be aligned with the central axis 12. The core 16 includes channels (not shown) for receiving wires that provide power to the LED lighting arrangement 24. In alternative embodiments, the channels may be omitted from the core.

The housing 14 includes a base 26 and a core receiving portion 28. The housing 14 is made up of a material that is different from the material that makes up the core 16. In one embodiment, the housing 14 is made up of a thermally conductive thermoplastic having a conductivity of at least 4 W/m-K and is manufactured using an additive manufacturing process. In alternative embodiments, the housing may be made up of other base thermoplastics, thermosets, and elastomers. In other alternative embodiments, the housing may be manufactured using an injection molding, compression molding, or extruding process.

In the illustrated embodiment, the base 26 includes a cylindrical portion 30 and a cone portion 32. In alternative embodiments, the base may be provided as any desired shape. The cone portion 32 is provided at a first end of the cylindrical portion 30. The core receiving portion 28 is provided at a second end of the cylindrical portion 30 opposite the first end. An LED driver 34 is provided in the cylindrical portion 30. The LED driver 34 converts an input power supply to an output power supply appropriate for the LED lighting arrangement 24. In other alternative embodiments, the LED driver may be provided elsewhere in or on the LED luminaire.

The core receiving portion 28 includes a central part 36 and a finned part 38. The central part 36 includes a recess 40 that receives the core 16. In the illustrated embodiment, the recess 40 is substantially cylindrical to reflect the substantially cylindrical shape of the core 16. In alternative embodiments, the recess may be provided as any desired shape. The core receiving portion 28, the recess 40, and the core 16 are dimensioned and configured such that, when the recess 40 receives the core 16, the second end 20 of the core 16 is substantially flush with an end surface of the central part 36. In alternative embodiments, the core receiving portion, the recess, and the core may be dimensioned and configured such that the second end of the core is recessed from or extends beyond the end surface of the central part.

The central part 36 further includes a plurality of channels (not shown). The channels extend between the recess 40 and the base 26 to which the core receiving portion 28 is attached. The channels may receive wires that place the LED lighting arrangement 24 and the LED driver 34 in electrical communication with one another. In alternative embodiments, the central part may include a greater or fewer number of channels, or the channels may be omitted.

The finned part 38 includes a plurality of discrete fins 44. The fins 44 extend radially from the central part 36 and are equally spaced from one another around the entire central part 36. In the illustrated embodiment, the fins 44 are arranged so that a periphery of the finned part 38 forms a substantially circular shape. In alternative embodiments, the fins may have unequal spacing or be provided on only a portion of the central part. In other alternative embodiments, the fins may extend from the central part at orientations other than radially. In still yet other alternative embodiments, the fins may be arranged so that a periphery of the finned part forms any desired shape.

In the illustrated embodiment, the finned part 38 is made up of fins 44 that each have a substantially identical shape. Accordingly, description of the fins 44 will be made with reference to a single fin. However, in alternative embodiments, the finned part may include fins having different shapes or arrangements.

The fin 44 is shaped as a right rectangular prism and extends between a first end 46 and a second end 48. The first end 46 is attached to the central part 36. The fin 44 includes first and second major side surfaces 50, 52 that are connected by first and second minor side surfaces 54, 2. The fins 44 are arranged on the central part 36 such that the first and second major side surfaces 50, 52 extend substantially parallel with the central axis 12 of the LED luminaire 10. In alternative embodiments, the fins may be provided as any desired shape. In other alternative embodiments, the fins may be arranged so that the first and second major side surfaces extend nonparallel with the central axis.

During operation of the LED luminaire 10 the LED lighting arrangement 24 and the LED driver 34 each generate heat. The core 16, as a result of its material or its construction, has a comparatively high thermal conductivity. This high thermal conductivity promotes the dissipation of heat from the LED lighting arrangement 24, which is mounted on the core 16. The housing 14 and the core 16 dissipate the generated heat of both the LED luminaire 10 and the LED lighting arrangement 24 into the surrounding atmosphere. The finned part 38 increases both the surface area and the surface area to volume ratio of the housing 14, thereby improving heat dissipation performance of the LED luminaire 10. Similarly, the passageways 22 of the core 16 increase both the surface area and the surface area to volume ratio of the core 16, thereby further improving heat dissipation performance. Additionally, the passageways 22 promote convective airflow through and about the core 16 and the housing 14, thus providing still further improved heat dissipation performance of the LED luminaire 10.

Figure 5:
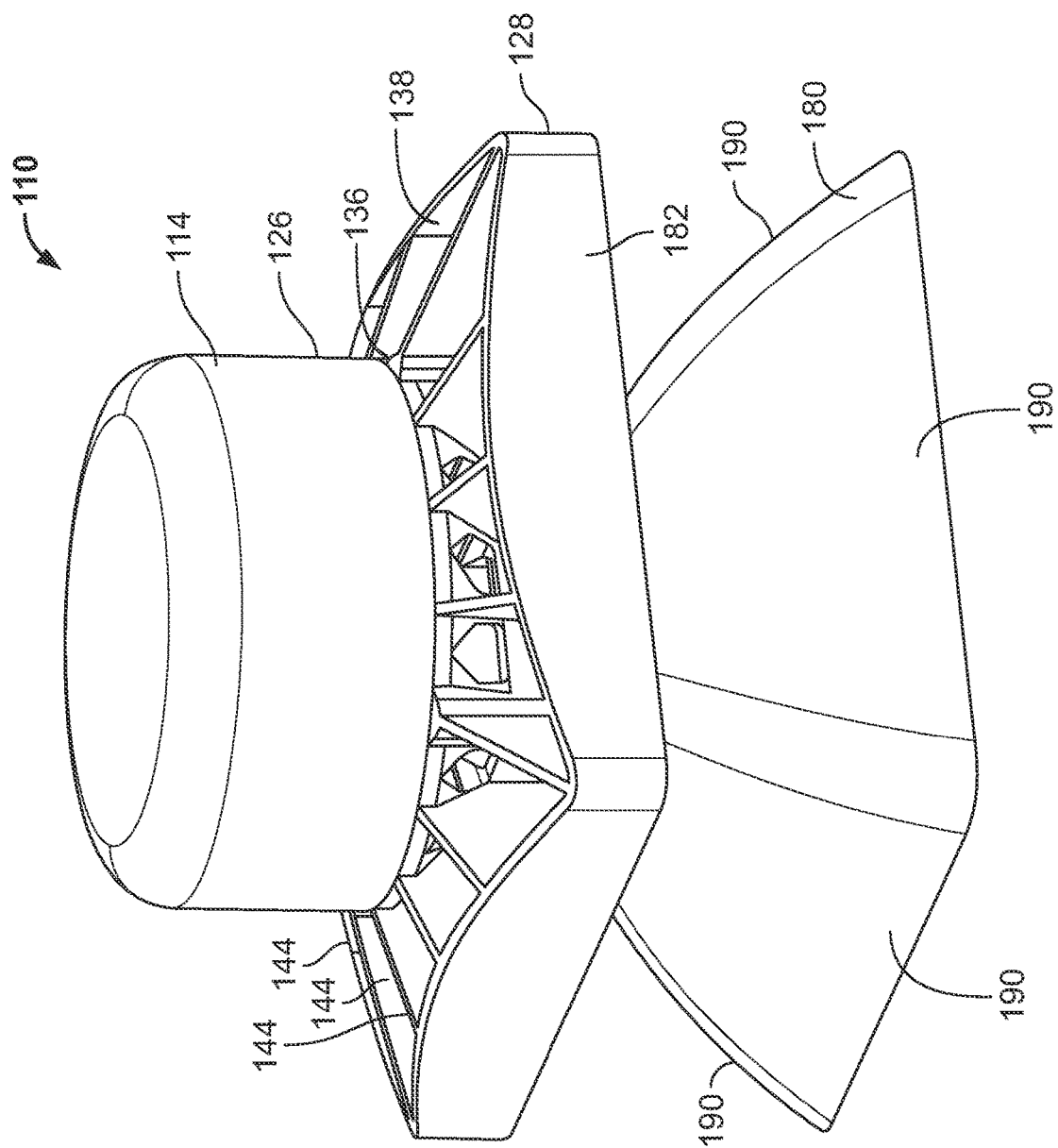
FIG. 5 is a perspective view of another embodiment of an LED luminaire.

FIG. 5 shows another embodiment of an LED luminaire 110. The luminaire 110 of FIG. 5 is substantially similar to the luminaire 10 of FIGS. 1-4 except for the differences described herein. Accordingly, like features will be identified by like numerals increased by a value of "100."

The luminaire 110 includes a housing 114, a core 116, and a reflector 180. The core 116 is substantially cylindrical and extends between a first end and a second end. A plurality of passageways (not shown) extend completely through the core 116 from the first end to the second end. An LED light arrangement 124 is mounted to the second end of the core 116.

The housing 114 includes a base 126 and a core receiving portion 128. The base 128 is substantially cylindrical and houses an LED driver 134. The core receiving portion 128 is provided at an end of the base 126, and includes a central part 136, a finned part 138, and a fence part 182. The central part 136 includes a recess 140 that receives the core 116. A plurality of channel (not shown) are provided in the central part 136. The channels may receive wires that place the LED lighting arrangement 124 and the LED driver 134 in electrical communication with one another.

The finned part 138 includes a plurality of discrete fins 144. The fins 144 extend radially from the central part 136 and are arranged so that a periphery of the finned part 138 forms a substantially square shape. The fence part 182 is provided about the periphery of the finned part 138. The fence part 182 interconnects ends of adjacent fins 144 to one another and forms a substantially square shape. The fence part 182 may improve the strength of the finned part 138 and thus contribute to improving the overall robustness of the LED luminaire 110. In alternative embodiments, the fence part may interconnect parts of the fins other than the ends, or may be arranged to form any desired shape.

The reflector 180 is secured to an end of the housing 114. The reflector 184 includes an attachment portion 186 and a light reflecting portion 188. The light reflecting portion 188 has a plurality of walls 190 that are arranged to form a substantially square-pyramidal shape, and includes a first open end 192 and a second open end 194. The attachment portion 186 is provided about the first open end 192 and is integral with the reflector 180. The attachment portion 186 secures the reflector 180 to the housing 114. According to one example embodiment, the attachment portion 186 is provided as a pair of resilient arms 196 that engage with recesses 198 provided on an end surface of the core receiving portion 128 of the housing 114. In alternative embodiments, the attachment portion may be any desired arrangement. In other alternative embodiments, the attachment portion may be omitted and the reflector may be attached to housing using adhesives, mechanical fasteners, or any other desired attachment arrangement.

When the reflector 180 is attached to the housing 114, the LED lighting arrangement 124 is received in the first open end 192. During operation of the LED luminaire 110, the reflector 180 directs and focuses light emitted by the LED lighting arrangement 124 in a desired manner. In alternative embodiments, design parameters of the reflector may be altered to provide the luminaire with desired lighting characteristics. For example, the reflector may be designed to provide a relatively narrow beam of relatively high intensity, or may be designed to provide a relatively wide beam of relatively low intensity.

While discrete embodiments and variants have been shown and described in FIGS. 1-6, the disclosed features are not exclusive to each described embodiment. Instead, various features can be combined in a luminaire as desired. For example, the reflector of FIGS. 5 and 6 may be used with the luminaire of FIGS. 1-4. As another example, the fence of FIGS. 5 and 6 may be used with the luminaire of FIGS. 1-4.

Figure 6:
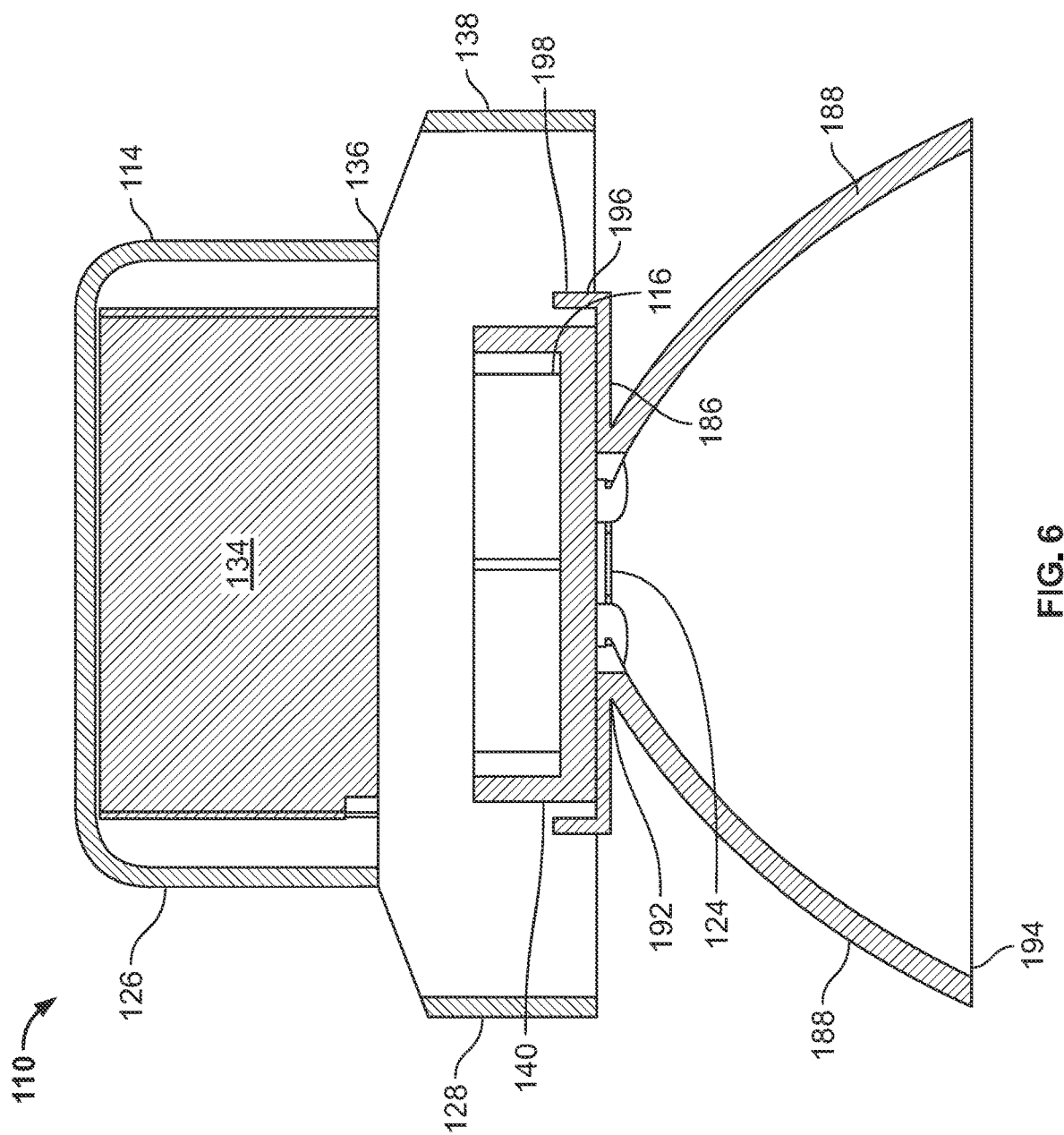
FIG. 6 is a sectional view of the LED luminaire of FIG. 5.

In the luminaire of FIGS. 1-4 and the luminaire of FIGS. 5 and 6, the housing 14, 114 may be manufactured using an additive manufacturing process, also known as 3D printing. Additive manufacturing is a process whereby an object is created by the deposition of successive of layers of material. The deposition of material layers may be controlled by a computer that reads a computer-aided design file. Categories of the additive manufacturing process include vat photopolymerization, material jetting, binder jetting, powder bed fusion, material extrusion, directed energy deposition, and sheet lamination. The additive manufacturing process enables the fabrication of housings with form factors that are not possible or difficult to produce using more traditional manufacturing techniques such as molding, extrusion, casting, or machining.

Figure 7:
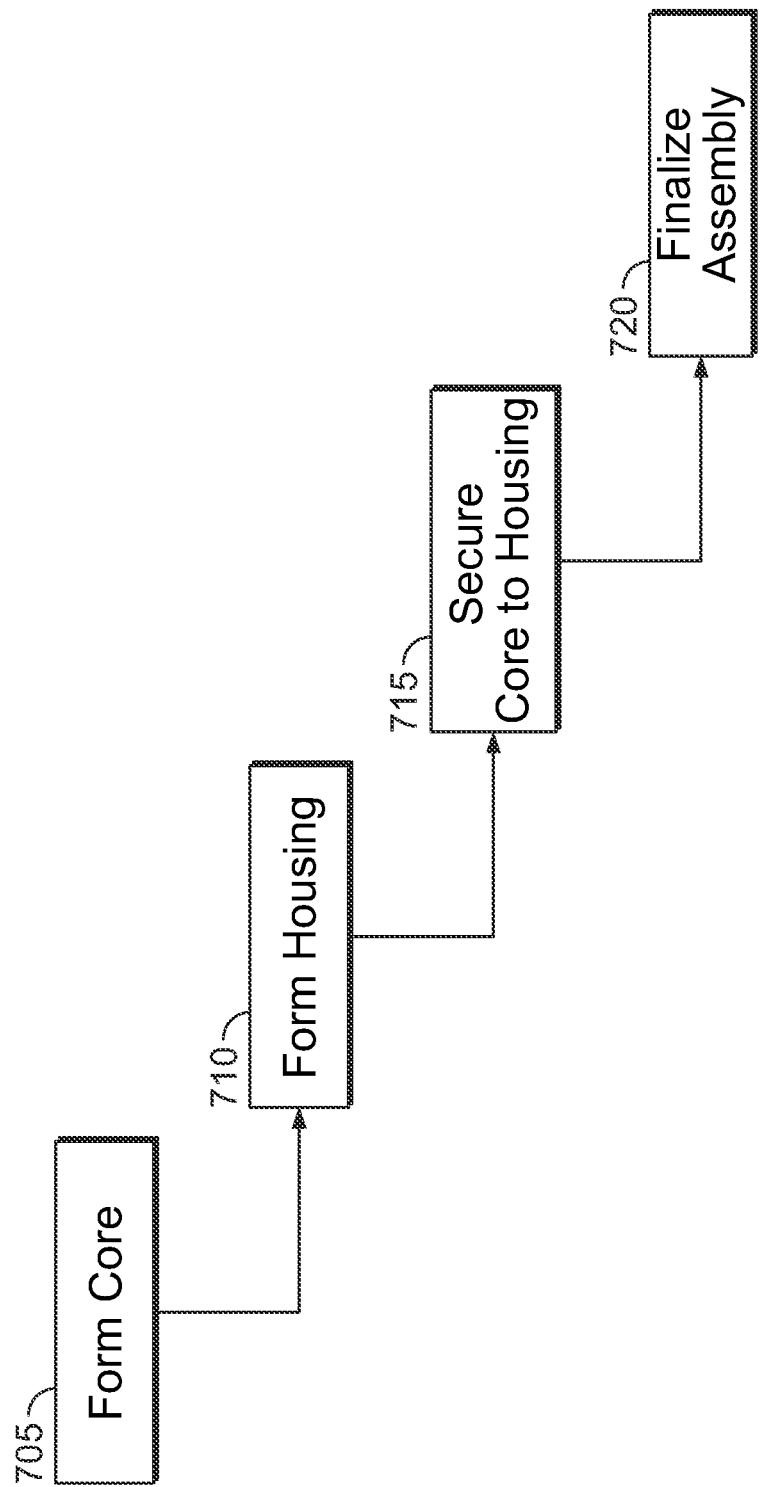
FIG. 7 is a flow chart showing an exemplary method of manufacturing an LED luminaire.

Referring to FIG. 7, a method of manufacturing a luminaire is described. At 705, a core is formed out of a first material and with a first width. According to one embodiment, the core is substantially cylindrical and the first width corresponds to a diameter of the core. According to one embodiment, the first material is a metallic material and the core is formed using an additive manufacturing process such as, for example, direct metal laser melting or metal binder jetting. The core may be configured according to the core described above and shown in FIGS. 1-4 or FIGS. 5 and 6. In alternative embodiments, the core may be provided as any desired shape. In other alternative embodiments, the first material may be any desired material and the core may be manufactured using any desired process.

At 710, a housing is formed out of a second material. The second material is different from the first material. According to one embodiment, the housing includes a recess having a second width. According to one embodiment, the recess is substantially cylindrical and the second width corresponds to a diameter of the recess. According to one embodiment, the second width is less than the first width. According to one embodiment, the second material is a thermoplastic elastomer and the housing is formed using an additive manufacturing process. The housing may be configured according the housing described above and shown in FIGS. 1-4 or FIGS. 5 and 6. In alternative embodiments, the housing may be provided as any desired shape. In other alternative embodiments, the second width may be greater than or equal to the first width. In other alternative embodiments, the second material may be any desired material and the housing may be manufactured using any desired process.

At 715, the core is secured to the housing. According to one embodiment, the step of securing involves creating a temperature differential between the core and the housing. For example, the core may be heated to a temperature that is below the melting point of the first material, but above the melting point of the second material. With the core at the elevated temperature, the core is introduced into the recess. The core is initially blocked from insertion into the recess due to the fact that the width of the recess is less than the width of the core. However, the elevated temperature of the core melts part of the housing, thus creating clearance for insertion of the core into the recess. Once the core cools, the core is retained in the recess and thus the core is secured to the housing.

As another example, the core may be cooled. Due to negative thermal expansion, the width of the core is reduced so as to be less than the width of the recess. While maintaining the reduced temperature, the core is introduced into the recess. Due to positive thermal expansion, once the core temperature increases the core will be retained in the recess and thus the core is secured to the housing. It has been found that under this method, the housing can retain the core without the use of an adhesive. In alternative embodiments, however, the core may be secured to the housing using any desired method. For example, the core may be secured to the housing using adhesives or mechanical fasteners, thermal interface material, or friction welding. In other alternative embodiments, the temperature differential may be achieved by heating or cooling the core.

At 720, the assembly of the luminaire of finalized. Finalization may include, for example, attaching an LED lighting arrangement to the core, providing an LED driver for the LED lighting arrangement, and establish electrical connections between the LED lighting arrangement and the LED driver.

Manufacturing the LED out of different materials and using different manufacturing techniques provides several benefits. Using thermoplastic elastomers and the additive manufacturing process to manufacture the housing enables fabrication of luminaires having form factors that are not possible or difficult to produce using more traditional manufacturing techniques such as molding, extrusion, casting, or machining. Using a metal material to form the core provides increased power capabilities over luminaires that are manufactured solely using thermally conductive polymers. Furthermore, using a metal core formed by more traditional manufacturing methods such as casting, in combination with the additive manufacturing process used to form the housing, decreases manufacturing costs compared to luminaires formed solely using an additive manufacturing process.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the application, in its broader aspects, is not limited to the specific details, the representative apparatus and method, and illustrative examples shown and described. For example, although the luminaire has been described as utilizing LEDs, similar concepts can be applied to luminaires using incandescent bulbs, or compact fluorescent lamps. Accordingly, departures may be made from such details without departing from the spirit or scope of the applicant's general inventive concept.

What is claimed is:

1. A luminaire comprising:
   a core made up of a first material;
   an LED lighting arrangement mounted to the core; and
   a housing made up of a second material, the second material being different from the first material, the housing including:
      a central part having a recess in which the core is received,
      a finned part including a plurality of fins that extend radially from the central part, and
      a fence part, the fence part being spaced from the central part so as to create a space therebetween, the fence part interconnecting adjacent fins to one another.

2. The luminaire of claim 1, wherein the plurality of fins are arranged so that a periphery of the finned part forms a substantially circular shape.

3. The luminaire of claim 1, wherein the plurality of fins are arranged so that a periphery of the finned part forms a substantially square shape.

4. The luminaire of claim 1, wherein the core includes a plurality passageways extending through the core.

5. A method of manufacturing a luminaire comprising the steps of:
   forming a core from a first material, the core having a first width corresponding to an exterior dimension of the core;
   forming a housing from a second material different from the first material, the housing including a recess, the recess having a second width corresponding to an interior dimension of the recess, the second width being less than the first width;
   creating a temperature differential between the first material and the second material;
   introducing the core into the recess to secure the core to the housing; and
   securing an LED lighting arrangement on the core.

6. The method of manufacturing a luminaire according to claim 5, wherein the step of creating a temperature differential includes heating the core.

7. The method of manufacturing a luminaire according to claim 6, wherein the core is heated to a temperature that is below the melting point of the first material, but above the melting point of the second material.

8. The method of manufacturing a luminaire according to claim 7, wherein the step of introducing the core into the recess includes melting part of the housing.

9. The method of manufacturing a luminaire according to claim 5, wherein the step of creating a temperature differential includes cooling the core.

10. The method of manufacturing a luminaire according to claim 5, wherein the step of forming a housing includes utilizing an additive manufacturing process.

11. A luminaire comprising:
    a core made up of a first material;
    an LED lighting arrangement mounted to the core;
    a housing made up of a second material that is different from the first material, the housing including a recess and a finned part, the recess receiving the core, a central part in which the recess is provided, the finned part extending from the central part, the housing further including a fence part spaced from the central part so as to create a space therebetween, the fence part interconnecting adjacent fins to one another; and
    a reflector secured to the housing, the reflector being configured to direct and focus light emitted by the LED arrangement.

12. The luminaire of claim 11, wherein the reflector includes an integral attachment portion for securing the reflector to the housing.

13. The luminaire of claim 11, wherein the core is made up of a material having a thermal conductivity greater than 34 W/m-K.

14. The luminaire of claim 13, wherein the core is manufactured using at least one of additive manufacturing, casting, and extrusion.

15. The luminaire of claim 11, wherein the housing is made up of a material having a thermal conductivity of at least 4 W/m-K.

16. The luminaire of claim 15, wherein the housing is manufactured using at least one of additive manufacturing, molding, and extruding.

\* \* \* \* \*